United States Patent
Puthoor et al.

(10) Patent No.: US 11,875,425 B2
(45) Date of Patent: Jan. 16, 2024

(54) IMPLEMENTING HETEROGENEOUS WAVEFRONTS ON A GRAPHICS PROCESSING UNIT (GPU)

(71) Applicant: ADVANCED MICRO DEVICES, INC., Santa Clara, CA (US)

(72) Inventors: Sooraj Puthoor, Austin, TX (US); Bradford Beckmann, Bellevue, WA (US); Nuwan Jayasena, Santa Clara, CA (US); Anthony Gutierrez, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/134,904

(22) Filed: Dec. 28, 2020

(65) Prior Publication Data
US 2022/0207643 A1 Jun. 30, 2022

(51) Int. Cl.
- *G06F 9/38* (2018.01)
- *G06T 1/20* (2006.01)
- *G06F 9/30* (2018.01)
- *G06F 9/54* (2006.01)

(52) U.S. Cl.
CPC ............ *G06T 1/20* (2013.01); *G06F 9/30036* (2013.01); *G06F 9/3836* (2013.01); *G06F 9/3877* (2013.01); *G06F 9/3887* (2013.01); *G06F 9/545* (2013.01); *G06T 2210/52* (2013.01)

(58) Field of Classification Search
None
See application file for complete search history.

(56) References Cited

U.S. PATENT DOCUMENTS

| | | | | |
|---|---|---|---|---|
| 5,179,702 A | * | 1/1993 | Spix | G06F 9/3838 717/124 |
| 5,423,051 A | * | 6/1995 | Fuller | G06F 9/3885 712/7 |
| 10,741,239 B2 | * | 8/2020 | Lea | G11C 11/4085 |
| 2008/0313424 A1 | * | 12/2008 | Gschwind | G06F 9/30123 712/23 |
| 2016/0085551 A1 | * | 3/2016 | Greathouse | G06F 9/3851 712/206 |
| 2020/0043123 A1 | * | 2/2020 | Dash | G06F 9/4881 |
| 2020/0293368 A1 | * | 9/2020 | Andrei | G06F 9/4881 |

OTHER PUBLICATIONS

Naghibijouybari et al., "Constructing and Characterizing Covert Channels on GPGPUs", MICRO-50 '17: Proceedings of the 50th Annual IEEE/ACM International Symposium on Microarchitecture (MICRO), Association for Computing Machinery, URL: https://dl.acm.org/doi/10.1145/3123939.3124538, Cambridge, MA, dated Oct. 2017, 13 pages.

* cited by examiner

*Primary Examiner* — Joni Hsu (57) ABSTRACT

Implementing heterogeneous wavefronts on a graphics processing unit (GPU) is disclosed. A scheduler assigns heterogeneous wavefronts for execution on a compute unit of a processing device. The heterogeneous wavefronts include different types of wavefronts such as vector compute wavefronts and service-level wavefronts that vary in resource requirements and instruction sets. As one example, heterogeneous wavefronts may include scalar wavefronts and vector compute wavefronts that execute on scalar units and vector units, respectively. Distinct sets of instructions are executed for the heterogeneous wavefronts on the compute unit. Heterogeneous wavefronts are processed in the same pipeline of the processing device.

20 Claims, 8 Drawing Sheets

GPU 401

Assign heterogeneous wavefronts for execution on a compute unit of the GPU 402

Assign a first wavefront of a first wavefront type for execution on the compute unit 404

Assign a second wavefront of a second wavefront type for execution on the compute unit 406

Concurrently execute distinct sets of instructions for the heterogeneous wavefronts on the compute unit 408

FIG. 4

GPU 401

Assign heterogeneous wavefronts for execution on a compute unit of the GPU 402

Concurrently execute distinct sets of instructions for the heterogeneous wavefronts on the compute unit 408

Execute a first set of instructions of a first wavefront on a single instruction multiple data (SIMD) unit of the compute unit 502

Execute a second set of instructions of second wavefront entirely on a scalar unit of the compute unit 504

FIG. 8

IMPLEMENTING HETEROGENEOUS WAVEFRONTS ON A GRAPHICS PROCESSING UNIT (GPU)

BACKGROUND

To improve performance, processors often include a graphics processing unit (GPU) to process graphics and video processing operations and certain other types of parallel computations. In order to efficiently execute these operations, the GPU divides the operations into threads and groups similar threads, such as similar operations on a vector or array of data, into sets of threads referred to as wavefronts. The GPU executes the threads of one or more wavefronts in parallel at different execution units of the GPU. Processing efficiency of the GPU can be enhanced by increasing the number of wavefronts that are "in-flight," that is, the number of wavefronts that are executing, or ready to be executed, at the execution units at a given point of time. However, the number of in-flight wavefronts is limited by the resources available at the GPU, such resources including the number of available execution units and the size of a register file used to by the execution units to execute the corresponding threads.

DETAILED DESCRIPTION

Orchestrating certain service-level operations on a graphics processing unit (GPU) using regular wavefronts results in the underutilization of parallel processing resources. For example, host signaling, network messaging, and processing-in-memory (PIM) orchestration may all be implemented in regular wavefronts. However, since these types of service-level operations only requires few threads to be active in a wavefront, the remaining parallel processing capacity is wasted. Also, wavefront slots that could have been used to run regular GPU kernels are consumed by kernels that do not participate in the vector computation.

Embodiments in accordance with the present disclosure provide support for heterogeneous wavefront execution. GPU resources are preserved by recognizing that particular types of operations do not require all of the resources of a regular wavefront. New wavefront types are introduced that are alternative to regular wavefronts, such that these alternative wavefronts may be executed along side the regular wavefronts. In a particular example, a scalar wavefront that executes only on the scalar core may be executed in a scalar wavefront, thus freeing up a wavefront slot for a regular wavefront on the parallel processing unit (e.g., a single instruction multiple data (SIMD) unit. Thus, heterogeneous types of wavefronts may execute a compute unit.

An embodiment in accordance with the present disclosure is directed to a method of implementing heterogeneous wavefronts on a GPU. The method includes assigning heterogeneous wavefronts for execution on a compute unit of a processing device and concurrently executing distinct sets of instructions for the heterogeneous wavefronts on the compute unit. In some implementations, assigning heterogeneous wavefronts for execution on a compute unit of a processing device includes assigning a first wavefront of a first wavefront type for execution on the compute unit and assigning a second wavefront of a second wavefront type for execution on the compute unit. The first wavefront type may be a vector compute wavefront type and the second wavefront type may be a service-level wavefront type. In some implementations, an execution slot occupied by a service-level wavefront is distinguished from an execution slot occupied by a vector compute wavefront in a scheduling queue of the compute unit.

In some implementations, concurrently executing distinct sets of instructions for the heterogeneous wavefronts on the compute unit includes executing a first set of instructions of a first wavefront on a single instruction multiple data (SIMD) unit of the compute unit and executing a second set of instructions of second wavefront entirely on a scalar unit of the compute unit. The second wavefront may include, for example, processing-in-memory instructions.

In some implementations, the method also includes allocating separate context storage spaces for two or more distinct types of wavefronts. In some implementations, heterogeneous wavefronts are embodied in separate instruction streams embedded in a single wavefront. In these implementations, the method also includes synchronizing instructions in the separate instruction streams. In some implementations, the method also includes receiving a command packet for launching a scalar kernel on the processing device.

An embodiment in accordance with the present disclosure is directed to a GPU for implementing heterogeneous wavefronts. The GPU is configured to assign heterogeneous wavefronts for execution on a compute unit of the GPU and concurrently execute distinct sets of instructions for the heterogeneous wavefronts on the compute unit.

In some implementations, assigning heterogeneous wavefronts for execution on a compute unit of the GPU includes assigning a first wavefront of a first wavefront type for execution on the compute unit and assigning a second wavefront of a second wavefront type for execution on the compute unit. The first wavefront type may be a vector compute wavefront type and the second wavefront type may be a service-level wavefront type.

In some implementations, concurrently executing distinct sets of instructions for the heterogeneous wavefronts on the compute unit includes executing a first set of instructions of a first wavefront on a single instruction multiple data (SIMD) unit of the compute unit and executing a second set of instructions of second wavefront entirely on a scalar unit of the compute unit. The second wavefront may include, for example, processing-in-memory instructions.

In some implementations, the GPU is also configured to separate context storage spaces for two or more distinct types of wavefronts. In some implementations, heterogeneous wavefronts are embodied in separate instruction streams embedded in a single wavefront. In these implementations, the GPU is also configured to synchronize instructions in the separate instruction streams. In some implementations, the GPU is also configured to receive a command packet for launching a scalar kernel on the GPU.

An embodiment in accordance with the present disclosure is directed to a device for implementing heterogeneous wavefronts. The device comprises a host central processing unit (CPU) and a GPU coupled to the host CPU. The GPU is configured to assign heterogeneous wavefronts for execution on a compute unit of the GPU and concurrently execute distinct sets of instructions for the heterogeneous wavefronts on the compute unit.

In some implementations, assigning heterogeneous wavefronts for execution on a compute unit of the GPU includes assigning a first wavefront of a first wavefront type for execution on the compute unit and assigning a second wavefront of a second wavefront type for execution on the compute unit. The first wavefront type may be a vector compute wavefront type and the second wavefront type may be a service-level wavefront type.

In some implementations, concurrently executing distinct sets of instructions for the heterogeneous wavefronts on the compute unit includes executing a first set of instructions of a first wavefront on a single instruction multiple data (SIMD) unit of the compute unit and executing a second set of instructions of second wavefront entirely on a scalar unit of the compute unit. The second wavefront may include, for example, processing-in-memory instructions.

In some implementations, the GPU is also configured to separate context storage spaces for two or more distinct types of wavefronts. In some implementations, heterogeneous wavefronts are embodied in separate instruction streams embedded in a single wavefront. In these implementations, the GPU is also configured to synchronize instructions in the separate instruction streams. In some implementations, the GPU is also configured to receive a command packet for launching a scalar kernel on the GPU.

Figure 1:
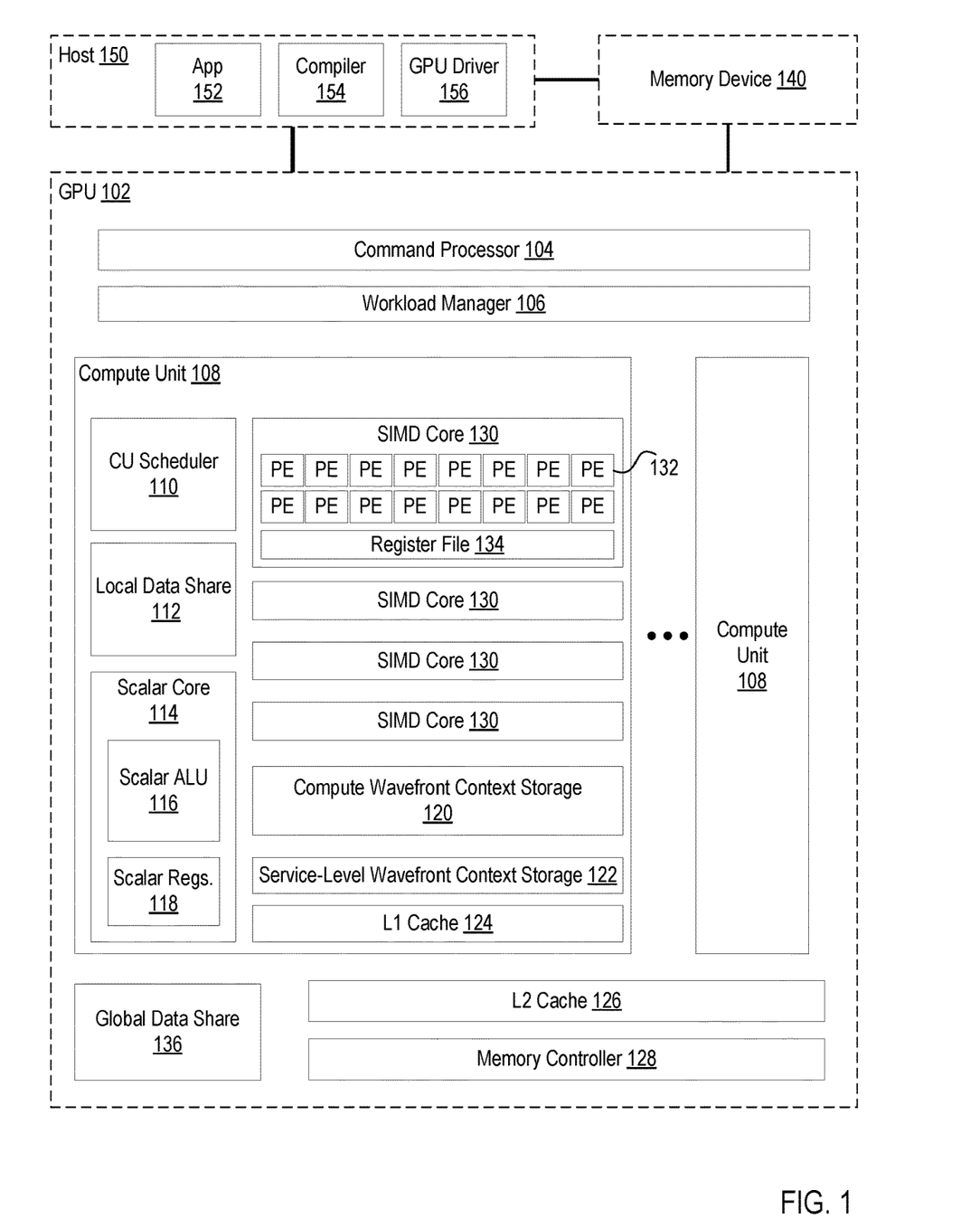
FIG. 1 sets forth a block diagram of an example system for implementing heterogeneous wavefronts on a GPU according to embodiments of the present disclosure.

Embodiments in accordance with the present disclosure will be described in further detail beginning with FIG. 1. FIG. 1 sets forth a block diagram of an example system 100 for implementing heterogeneous wavefronts on a GPU in accordance with the present disclosure. The example system 100 of FIG. 1 includes a GPU 102 coupled to a host processor 150. The GPU 102 is particularly adapted for parallel processing and executes parallel processing tasks assigned by the host processor 150. The term "GPU" is used throughout this disclosure to encompass conventional GPUs used for executing graphics processing tasks that are output to a display, general purpose GPUs (GPGPUs) for intensively parallel processing tasks (e.g., neural network training, deep learning models, scientific computation, etc.), or other accelerated computing devices.

In an illustrative embodiment, the host processor 150 transmits selected commands to the GPU 102. These selected commands can include graphics commands, compute processing commands, and other commands amenable to parallel execution. Some parallel computation operations can require that the same command stream or compute kernel be performed on streams or collections of input data elements. Respective instantiations of the same compute kernel can be executed concurrently on multiple compute units 108 in order to process such data elements in parallel. As referred to herein, for example, a compute kernel is a function containing instructions declared in a program and launched on the GPU 102 for parallel execution. In some programming models, such a function may be declared using a keyword such as "_global_" to indicate to a compiler that the compiler should generate instruction set architecture (ISA) instructions for execution on the GPU 102.

In the example depicted in FIG. 1, the GPU 102 includes multiple compute units 108 each including one or more SIMD cores 130. In this example, the compute unit 108 includes four SIMD cores 130, although it will be appreciated that a compute unit 108 may include one or more SIMD cores 130. Each SIMD core 130 includes multiple processing elements 132 for parallel processing. A processing element 132 includes an arithmetic logic unit (ALU) for executing an arithmetic operation in parallel with other processing elements 132. In some examples, a single instruction is issued to the SIMD core 130, the instruction being executed by multiple processing elements on respective data elements. In the example of FIG. 1, each SIMD core 130 includes 16 processing elements 132, and thus has 16 lanes for processing streams of input elements; however, a SIMD core 130 may contain two or more processing elements 132. Each SIMD core 130 also includes a register file 134 including a number of vector general purpose registers (VGPR).

Each processing element 132 can execute a respective instantiation of a particular work-item to process incoming data. A work-item is one of a collection of parallel executions of a kernel invoked on a device by a command. The work-item is the basic unit of execution in a compute unit 108 and may also be referred to herein as a "thread." Each work-item represents a single instantiation of a program that is to be executed in parallel in a particular lane. Work-items can be executed simultaneously (or partially simultaneously and partially sequentially) as a "wavefront" on a single SIMD core 130. One or more wavefronts are included in a "work group," which includes a collection of work-items designated to execute the same program on the same compute unit 108. A work group can be executed by executing each of the wavefronts that make up the work group. In alternatives, the wavefronts are executed on a single SIMD core 130 or on different SIMD cores 130. Wavefronts can be thought of as the largest collection of work-items that can be executed simultaneously (or pseudo-simultaneously) on a single SIMD core 130. "Pseudo-simultaneous" execution occurs in the case of a wavefront that is larger than the number of lanes in a SIMD core 130. In such a situation, wavefronts are executed over multiple cycles, with different collections of the work-items being executed in different cycles. The work-items in the group execute the same kernel and share local memory and work-group barriers.

The number of work-items in a wavefront and the number of wavefronts in a work group may be selected by the programmer or compiler, although the number of lanes in a SIMD core 130 is hardware dependent. Thus, in the example SIMD core 130 that includes 16 lanes, a wavefront that includes 64 work-items would require 4 cycles on the SIMD core 130 to execute the wavefront.

In some examples, all wavefronts from a workgroup are processed on the same compute unit 108. Instructions across a wavefront are issued one at a time, and when all work-items follow the same control flow, each work-item executes the same instruction in lockstep. In some examples, all instructions in a wavefront are issued to and executed on the same SIMD core 130. Each SIMD core 130 may also include a wavefront buffer (not depicted) to buffer multiple wavefronts (e.g., 10 wavefronts).

In some examples, the GPU 102 includes a workload manager 106 and each compute unit 108 includes a compute unit (CU) scheduler 110. To execute a compute kernel on the GPU 102 dispatched by the command processor 104, the workload manager 106 determines how many work-items in the kernel are to be performed for and generates one or more workgroups for distribution to the compute units 108. Each workgroup is assigned to one particular compute unit 108. The workload manager 106 assigns workgroups to compute units 108 based on various factors such as resource availability, load balancing, and potentially other factors. When a workgroup is assigned to a compute unit 108, a particular amount of resources of the compute unit 108 are consumed. The CU scheduler 110 manages workgroups that have been assigned to the compute unit 108 by the workload manager 106. Specifically, the CU scheduler 110 breaks workgroups up into wavefronts and schedules the wavefronts for execution on individual SIMD cores 130. When a wavefront is scheduled on a SIMD core 130, a particular amount of resources on the SIMD core 130 are consumed.

In some examples, the compute unit 108 also includes a local data share 112. The local data share 112 includes storage local to the compute unit 108 that may be shared by all work-items executing on the compute unit. For example, the local data share 112 may store data elements that are inputs to various work-items (i.e., threads) executing on the SIMD core 130. In some examples, the local data share 112 is used for communications between SIMD cores 130. A portion of the local data share 112 may be included in resources allocated to a workgroup or wavefront.

In some examples, the compute unit 108 also includes an L1 cache 124. The L1 cache 124 is a read/write cache that may include vector data that is the input to or result of a wavefront execution. The L1 cache 124 may be a write-through cache to an L2 cache 126 of the GPU 102. The L2 cache 126 is coupled to all of the compute units 108 and may serve as a coherency point for the GPU 102.

The compute unit 108 also includes a scalar core 114 that includes a scalar ALU 116 and scalar registers 118 for computing scalar values. In some examples, the scalar core 114 is shared by all work-items in each wavefront, accessed on a per-wavefront level. For example, work-items in a wavefront performing the exact same operation can offload this instruction to the scalar core 114. In some examples, the scalar core 114 is used for branching, control flow, pointer arithmetic, memory address generation, dispatching a common constant value, and other scalar operations. In an embodiment in accordance with the present disclosure, the scalar core 114 is used to execute a scalar wavefront, as will be described in detail below. In some examples, the scalar ALU 116 includes an integer ALU. In some examples, the scalar registers 118 include scalar general purpose registers (SGPRs).

In some examples, the GPU 102 includes a global data share 136. The global data share 136 stores data that may be shared across the compute units 108. For example, the global data share 136 may be DRAM memory accessible by the GPU 102 that goes through some layers of cache (e.g., the L2 cache 126).

In some examples, the GPU 102 includes one or more memory controllers 128. In these examples, output of the program executing on the GPU 102 may be stored or shared with another device (e.g., the memory device 140, other GPUs, etc.). In some cases, the memory controller 128 sends commands to the memory device 140 to read/write data to/from the memory device, for example, over a PCIe interface. For example, the memory device may be dual in-line memory modules (DIMM) utilized as system memory. In some cases, the memory device may be a high bandwidth memory (HBM) device stacked on the GPU 102 or coupled to the GPU 102 via an interposer. In some examples, the memory device, is a PIM-enabled memory device that includes one or more ALUs for performing computations within the memory device. In some cases, the memory controller 128 sends requests to receive or transmit data to other GPUs via a communication fabric.

In some examples, the compute unit 108 includes a compute wavefront context storage 120. Each SIMD core 130 has a limited number of registers in the register file 134 available to store context information. The SIMD core 130 may therefore stall if all of the threads represented by the context information stored in the registers of the SIMD core 130 are waiting for instructions to complete. Context information for the instructions that have the highest latency (or are expected to complete after the longest time interval) may be swapped out of the registers so that the SIMD core 130 can initiate instructions associated with other wavefronts while waiting for the high latency instructions to complete. Context information for the high latency threads/wavefronts may therefore be moved from the registers in the register file 134 of the SIMD core 130 to compute wavefront context storage 120, which may be implemented in as individual storage buffers or in other memory associated with the GPU 102. Context information for the wavefront that is ready for execution may then be moved from the compute wavefront context storage 120 to the available registers in the register file 134 in the SIMD core 130. In some examples, the memory controller 128 controls movement of the context information between the registers and the context buffers.

For further explanation, consider an example where an application 152 executing on the host processor 150 includes a function call to launch a compute kernel on the GPU 102. For example, the compute kernel may include vector instructions amenable to parallel processing on one or more SIMD cores 130 (e.g., graphics processing, inference tasks of a neural network, computational physics simulations, etc.). Where source code for the application 152 includes a keyword for launching a GPU kernel (e.g., a global function call), a compiler 154 recognizes the keyword and generates vector ISA instructions for the kernel. A GPU driver 156 transmits a command packet for the kernel instructions to the GPU 102. The command packet may specify grid dimensions for the collection of work-items in the kernel as well as workgroup dimensions for a subset of the collection of work-items that compose a workgroup. In one example, the command packet is an Architected Queuing Language (AQL) packet of the type HSA_PACKET_TYPE_KERNEL_DISPATCH.

Continuing the above example, the command packet is received by the command processor 104 of the GPU 102. The command processor 104 fetches and decodes the offloaded kernel instructions and dispatches work-items for the compute kernel as workgroups. The command processor 104 assigns each workgroup to a compute unit 108. Hardware resources, such as SIMD cores and VGPRs, are allocated to the workgroup at the time of assignment. One or more workgroups is received at the CU scheduler 110 and the work-items in each workgroup are organized into wavefronts. As a trivial example, a workgroup containing 256 work-items is organized by the CU scheduler 110 into 4 wavefronts each including 64 work-items. Each wavefront is assigned to a respective SIMD core 130. As each SIMD core 130 includes 16 lanes, each SIMD core 130 can execute its respective wavefront in 4 cycles. Operating in parallel, 4 SIMD cores 130 execute the 256 work-items in those 4 cycles.

In the above example, each wavefront is allocated the same amount of hardware resources in the compute unit 108. That is, each wavefront utilizes the same number of VGPRs in the register file 134 of the SIMD core 130. As previously discussed, service-level operations (e.g., operating system or network messaging, PIM orchestration, etc.) may be executed within wavefronts just like the vector compute operation in the above example. However, such service-level operations typically require fewer work-items/threads and fewer VGPRs (if any). For example, a scalar thread that executes on the scalar core 114 does not use any VGPRs. Executing service-level operations in a wavefront occupies a wavefront slot that could be used for other vector compute operations. Moreover, during wavefront execution for vector compute operations, the scalar core 114 for one-off calculations but generally remains underutilized.

In accordance with embodiments of the present disclosure, the GPU 102 is adapted to execute heterogeneous types of wavefronts, including compute wavefronts and service-level wavefronts. A compute wavefront is a regular or conventional wavefront that performs parallel vector compute operations on distinct data elements. In a compute wavefront, as with a regular or conventional wavefront, optimal scheduling of the compute wavefront results in utilization of all processing elements 132 of the SIMD core 130 in a cycle. As used herein, a service-level wavefront includes system and messaging operations such as signaling a host operating system, network messaging, PIM orchestration, and so on. In contrast to compute wavefronts, service-level wavefronts are guaranteed to use fewer than all processing elements 132 of the SIMD core 130, if any at all. Readers will appreciate that, by scheduling service-level operations in a wavefront type that is distinct from a regular wavefront (i.e., a vector compute wavefront), resources typically allocated to a regular wavefront are preserved when executing service-level operations in a wavefront. In some implementations, an execution slot occupied by a service-level wavefront is distinguished from an execution slot occupied by a vector compute wavefront in the CU scheduler 110 of the compute unit 108.

In some examples, a service-level wavefront includes a scalar wavefront. A scalar wavefront is a wavefront that executes only on the scalar cores 114 of the GPU 102. Work-items (i.e., scalar threads) in the scalar wavefront are processed using the scalar ALU 116 and scalar registers 118 of the scalar core 114. Thus, a scalar wavefront does not utilize SIMD core resources such as processing elements/lanes and VGPRs. In some examples, scalar wavefronts are scheduled from a scalar wavefront pool, such that the CU scheduler 110 may schedule a ready wavefront from either the regular vector compute wavefront pool or the scalar wavefront pool. In some examples, scalar wavefronts and regular vector compute wavefronts are scheduled from the same pool such that a scalar wavefront occupies the same wavefront slot as a regular vector compute wavefront. When the scalar wavefront occupies an execution slot in the CU scheduler 110 among execution slots occupied by regular vector compute wavefronts, the slot occupied by the scalar wavefront may be identified as containing a scalar wavefront. For example, a flag bit in the slot may be used to identify whether the wavefront occupying the slot is a scalar wavefront or a regular vector compute wavefront. The scalar wavefront does not include code for control flow management (e.g., an execute mask instruction that determines which threads are executed). The scalar wavefront is executed concurrently with the vector compute wavefront(s). Thus, where a compute unit includes four SIMD cores 130 and one scalar core 114, the compute unit 108 can execute up to five wavefronts (four vector compute wavefronts+one scalar wavefront) concurrently.

To accommodate the launching of scalar wavefronts, a programming model includes directives for launching a scalar kernel. In some examples, the programming model includes a keyword to indicate a particular function or section of code should be launched as a scalar kernel that executes only on the scalar core 114 of the GPU 102. In these examples, the programming model may include a _scalar_keyword for a function or code section that operates similarly to the "_global_" keyword discussed above. For example, a "_scalar_" function can be called from both the host processor 150 and from the GPU 102 itself. The compiler 154, upon encountering the scalar keyword (e.g., "_scalar_"), generates only scalar ISA instructions for the kernel.

In some examples, the GPU driver 156 generates a command packet for launching the scalar kernel on the GPU 102. In some implementations, a special command packet type is employed for launching scalar kernels on the GPU 102. Using the AQL format discussed above, a special AQL packet type is used to launch scalar kernels (kernels with only scalar wavefronts). Dispatch information in the packet related to workgroup size and grid size are specified in terms of scalar threads. That is, the grid dimension and the workgroup size provide the number of scalar wavefronts as opposed to number of work-items/threads.

In some examples, the command processor 104 parses a command packet for a scalar kernel and provisions hardware resources in the same way that a vector compute kernel is processed. However, the VGPR requirement of scalar kernel is zero. Hence, the VGPR allocation is not a constraint when analyzing the resource requirement to launch a scalar kernel. In some examples, the workload manager 106 dispatches scalar kernels in workgroups to various compute units 108. In some implementations, a scalar wavefront is placed into a workgroup along with vector compute wavefront.

In some examples, the compute unit 108 receives the workgroup assignment and parses the work-items/threads into wavefronts. In these examples, wavefronts are placed in a wavefront pool (e.g., a buffer) until they are ready for dispatch to an execution unit. In some implementations, scalar wavefronts are placed into a scalar wavefront pool while vector compute wavefronts are placed into the vector compute wavefront pool, such that the CU scheduler 110 may schedule ready wavefronts from either pool. In other implementations, scalar wavefronts and vector compute wavefronts are placed into the same wavefront pool, such that the scalar wavefronts occupy the same wavefront slot as vector compute wavefronts and is scheduled like a vector compute wavefront. When a scalar wavefront is ready, the scalar wavefront is dispatched to the scalar core 114 and when a vector compute wavefront is ready, the vector wavefront is dispatched to a SIMD core 130. Considering an example where, in the same cycle, a thread in a scalar wavefront is executed on the scalar core 114 and threads in a vector compute wavefront are executed on a SIMD core 130, separate instructions are issued to the scalar core 114 and the SIMD core 130 to execute the threads of their respective wavefronts in that same cycle. In this way, heterogeneous wavefronts executing distinct code are concurrently executed on the compute unit.

In some implementations, a single wavefront instruction stream is used to schedule scalar kernels and vector kernels in the same wavefront instruction stream. For example, functionality that requires vector processing in the SIMD cores 130 and functionality that requires only scalar processing in the scalar core 114 are embedded in the same wavefront. In a programming model, scalar sections of code in a GPU kernel may be indicated with directives. For example, within a global function call to launch a kernel on the GPU, regions of the code that require only scalar functionality may be annotated (e.g., #pragma scalar, or as a scalar function). The annotated scalar regions of the code and the regular vector code are treated as independent instruction streams. Although in-order fetch and dispatch logic fetches and dispatches the instructions in-order, because the scalar and vector instructions streams are treated independently, the actual execution and completion of these instructions can be out-of-order.

In some examples, a synchronization primitive is used to synchronize between scalar instructions and vector instructions in the same wavefront. For example, a program order synchronization instruction (e.g., "PROGRAM_ORDER_SYNCH") blocks the dispatch of the younger instructions until all instructions (both scalar and vector instructions) from that wavefront are completed. In some programming models, a data dependency instruction (e.g., s_waitcnt) can only block dispatch until all the outstanding memory instructions are completed; however, a PROGRAM_ORDER_SYNCH instruction blocks dispatch until all instructions in the wavefront are completed).

In some examples, a service-level wavefront includes a system operation wavefront. A system operation wavefront is a wavefront that executes on the scalar cores 114 and a subset of the processing elements 132 of a SIMD core 130 on the GPU 102. The system operation wavefront may execute primarily on the scalar core 114 using some, but not all, lanes of the SIMD core 130. For example, a system operation wavefront may perform a system operation like network messaging or operating system signaling on behalf of other wavefronts. Work-items (i.e., system operation threads) in the system operation wavefront are processed using the scalar ALU 116 and scalar registers 118 of the scalar core 114 a subset of processing elements 132 and VGPRs in the SIMD core 130. That is, the system operation wavefront utilizes less hardware resources in the SIMD core 130 than would be utilized by a vector compute wavefront. Thus, a system operation wavefront does not utilize as many SIMD core resources such as processing elements/lanes and VGPRs as would be allocated for a vector compute wavefront. In some examples, system operation wavefronts are scheduled from a system operation wavefront pool, such that the CU scheduler 110 may schedule a ready wavefront from either the regular vector compute wavefront pool or the system operation wavefront pool. In some examples, system operation wavefronts and regular vector compute wavefronts are scheduled from the same pool such that a system operation wavefront occupies the same wavefront slot as a regular vector compute wavefront. When the system operation wavefront occupies an execution slot in the CU scheduler 110 among execution slots occupied by regular vector compute wavefronts, the slot occupied by the system operation wavefront may be identified as containing a system operation wavefront. For example, a flag bit in the slot may be used to identify whether the wavefront occupying the slot is a system operation wavefront or a regular vector compute wavefront. In some examples, the system operation wavefront does not utilize any scalar resources.

To accommodate the launching of system operation wavefronts, a programming model includes directives for launching a system operation kernel. In some examples, the programming model includes a keyword to indicate a particular function or section of code should be launched as a system operation kernel that executes only on the scalar core 114 and a subset of resources of a SIMD core 130 of the GPU 102. In these examples, the programming model may include a "system" keyword for a function or code section that operates similarly to the "_global_" keyword discussed above. For example, a "_system_" function can be called from both the host processor 150 and from the GPU 102 itself.

In some examples, the GPU driver 156 generates a command packet for launching the system operation kernel on the GPU 102. In some implementations, a special command packet type is employed for launching system operation kernels on the GPU 102. Using the AQL format discussed above, a special AQL packet type is used to launch system operation kernels. Dispatch information in the packet related to workgroup size and grid size are specified in terms of scalar threads and vector work-items.

In some examples, the command processor 104 parses a command packet for a system operation kernel and provisions hardware resources in the same way that a vector compute kernel is processed. However, the VGPR requirement of system operation kernel is less than the width of the SIMD core (e.g., less than 16 in the SIMD core 130 of FIG. 1). Hence, the VGPR allocation is smaller when analyzing the resource requirement to launch a system operation kernel. In some examples, the workload manager 106 dispatches a system operation kernel in workgroups to various compute units 108. In some implementations, a system operation wavefront is placed into a workgroup along with vector compute wavefront.

In some examples, the compute unit 108 receives the workgroup assignment and parses the work-items/threads into wavefronts. In these examples, wavefronts are placed in a wavefront pool (e.g., a buffer) until they are ready for dispatch to an execution unit. In some implementations, scalar wavefronts are placed into a system operation wavefront pool while vector compute wavefronts are placed into the vector compute wavefront pool, such that the CU scheduler 110 may schedule ready wavefronts from either pool. In other implementations, system operation wavefronts and vector compute wavefronts are placed into the same wavefront pool, such that the system operation wavefronts occupy the same wavefront slot as vector compute wavefronts and is scheduled like a vector compute wavefront. When a system operation wavefront is ready, the system operation wavefront is dispatched to the scalar core 114 and a SIMD core 130, and when a vector compute wavefront is ready, the vector wavefront is dispatched to a SIMD core 130.

In some examples, the GPU 102 or each compute unit 108 of the GPU 102 includes service-level wavefront context storage 122 that provides a separate storage space for storing scalar and service-level wavefronts apart from vector compute wavefront contexts in the compute wavefront context storage 120. While the GPU 102 stores multiple wavefront contexts and switches among them when encountered with long latency memory operations, a vector compute wavefront context requires more storage space than a service-level wavefront context. That is, a scalar wavefront and a system operation wavefront utilize fewer registers than a typical vector compute wavefront, and thus there is less context information to store. As another example, divergence information stored for a vector compute wavefront need not be stored for a scalar wavefront or system operation wavefront. By storing service-level wavefront contexts in a separate storage space, additional room is freed in the compute wavefront context storage 120. In some examples, scalar wavefront contexts and system operation contexts are stored together in the service-level wavefront context storage 122, while in other examples scalar wavefront contexts and system operation contexts each have a dedicated service-level wavefront context storage 122.

Figure 2:
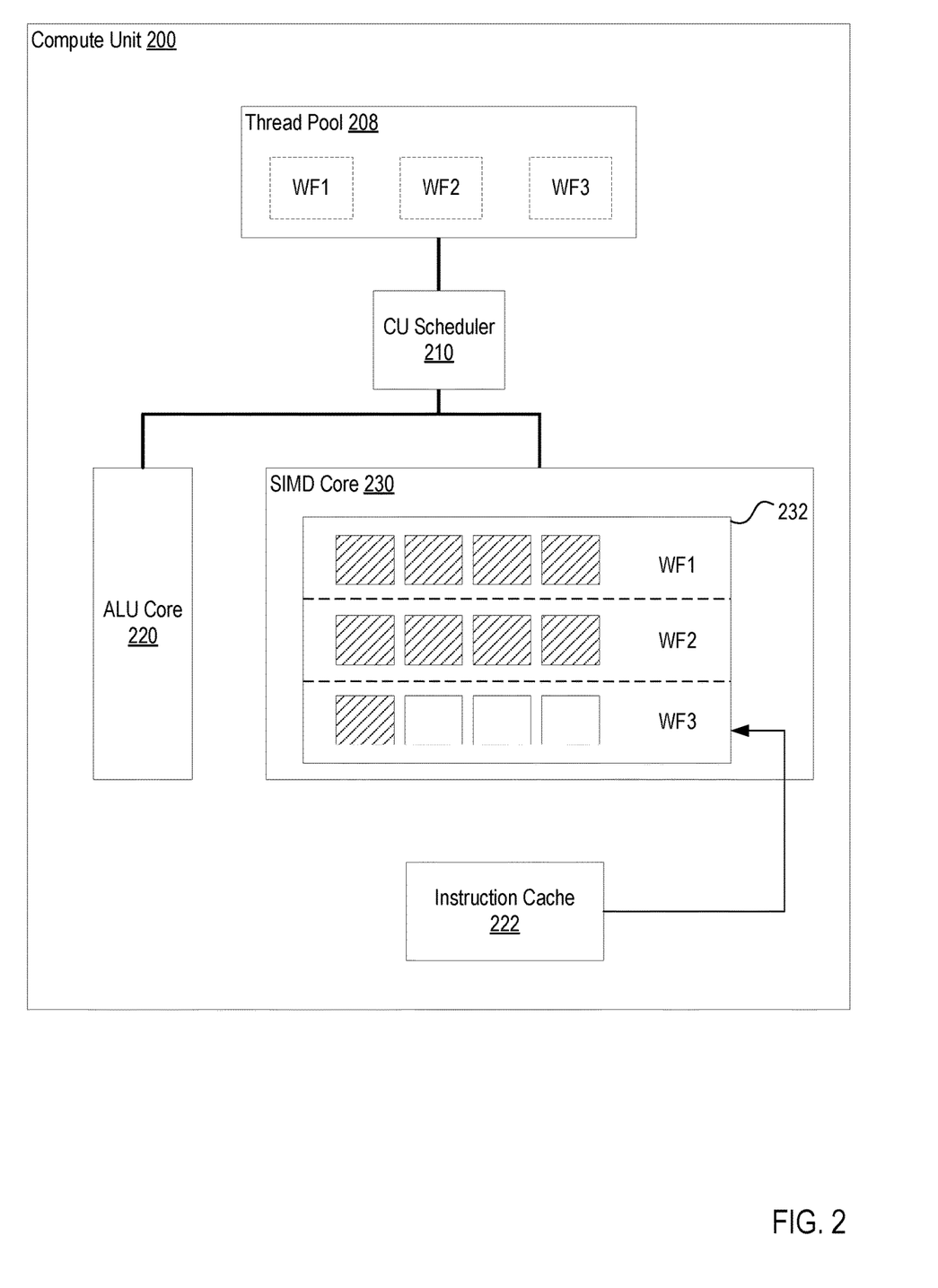
FIG. 2 sets forth a block diagram of another example system for implementing heterogeneous wavefronts on a GPU according to embodiments of the present disclosure.

For further explanation, FIG. 2 sets forth a block diagram of an example compute unit 200 that is not configured for executing heterogeneous types of wavefronts. The example compute unit 200 of FIG. 2 includes a CU scheduler 210 that schedules wavefronts from a wavefront pool 208 onto a SIMD core 230. For ease of illustration, assume that the SIMD core 230 is a four lane SIMD core and includes a wavefront buffer 232 for holding three vector compute wavefronts scheduled to execute on the SIMD core 230. The compute unit 200 also includes a scalar core 220 used for branches, control flow, pointer arithmetic, dispatch a common constant value, etc. The CU scheduler fetches instructions from an instruction cache 222 and issues instructions to the SIMD core 230 and the scalar core 220.

Consider an example where the wavefront pool 208 includes three wavefronts—WF1 executes a vector compute operation, WF2 executes another vector compute operation, and WF3 orchestrates PIM operations. The CU scheduler 210 schedules wavefronts WF1, WF2, and WF3 for execution on the SIMD core 230 by placing them in the wavefront buffer 232. In an execution cycle, wavefronts WF1 and WF2 includes work-items/threads to occupy all four lanes of the SIMD core 230, whereas the PIM operations in wavefront WF3 only includes one thread that occupies one lane. This results in an underutilization of the SIMD core 230 in executing the PIM operations.

Figure 3:
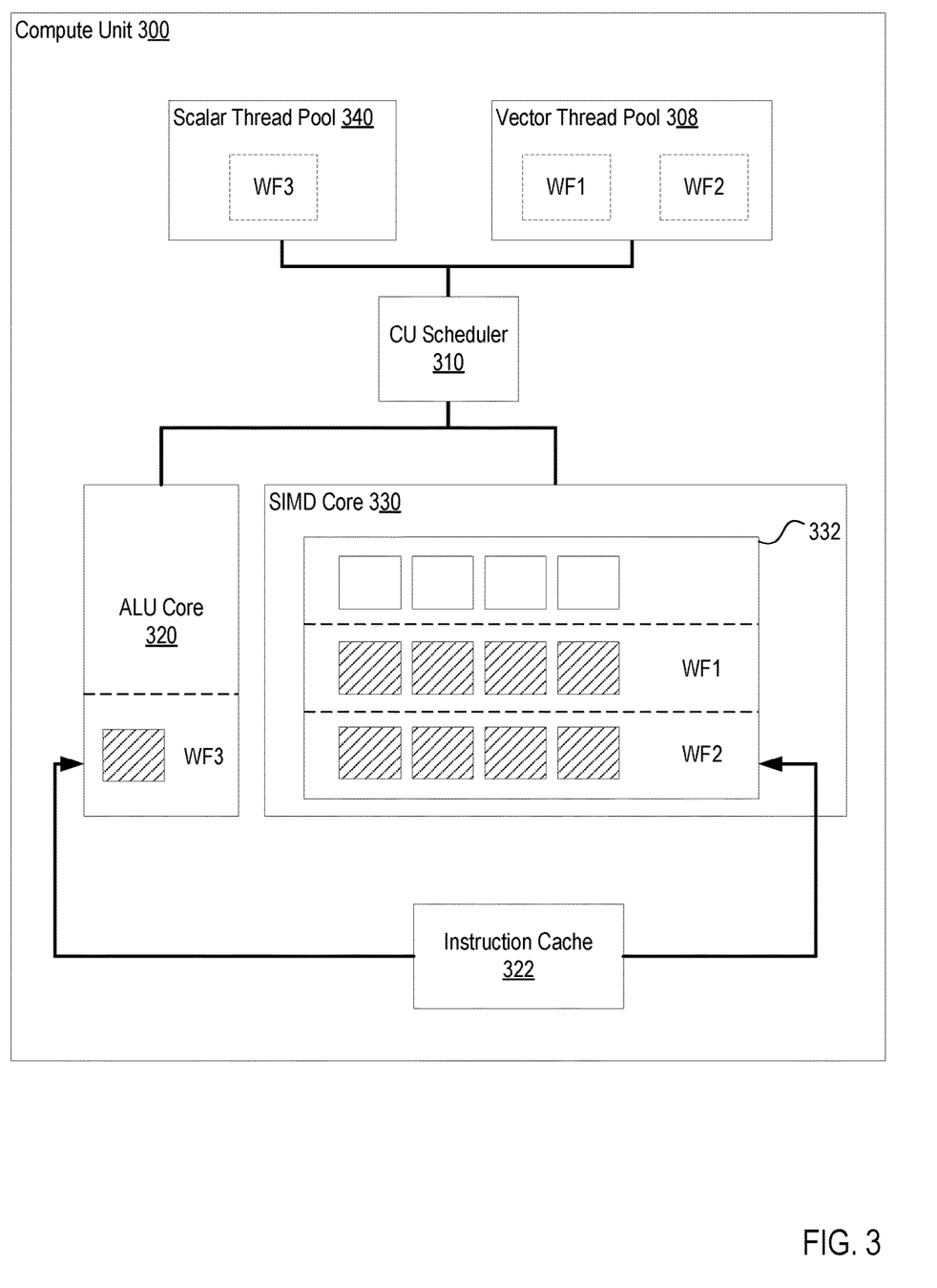
FIG. 3 sets forth a block diagram of another example system for implementing heterogeneous wavefronts on a GPU in accordance with embodiments of the present disclosure.

For further explanation, FIG. 3 sets forth a block diagram of an example compute unit 300 that is configured for executing heterogeneous types of wavefronts in accordance with the present disclosure. The example compute unit 300 of FIG. 2 includes a CU scheduler 310 that schedules wavefronts from a vector wavefront pool 308 onto a SIMD core 330 and schedules scalar wavefronts from a scalar wavefront pool 340 onto a scalar core 320. For ease of illustration, assume that the SIMD core 330 is a four lane SIMD core and includes a wavefront buffer 332 for holding three vector compute wavefronts scheduled to execute on the SIMD core 330. The compute unit 300 also includes a scalar core 320 used executing scalar wavefronts as well as for branches, control flow, pointer arithmetic, dispatch a common constant value, etc. The CU scheduler 310 fetches instructions from an instruction cache 322 and issues instructions to the SIMD core 330 and the scalar core 320.

Consider an example where the vector wavefront pool 308 includes two vector wavefronts—WF1 executes a vector compute operation and WF2 executes another vector compute operation. The scalar wavefront pool 340 includes a scalar wavefront WF3 that orchestrates PIM operations (which requires only scalar arithmetic). The CU scheduler 310 schedules vector wavefronts WF1 and WF2 for execution on the SIMD core 330 by placing them in the wavefront buffer 332. The CU scheduler 310 schedules scalar wavefront WF3 on the scalar core 320. In an execution cycle, the vector wavefront WF2 executes on the SIMD core 230 based on a vector ALU instruction from the instruction cache 322 and the scalar wavefront WF3 executes on the scalar core 320 based on a scalar ALU instruction from the instruction cache 322. This results in additional resources in the SIMD core 330 for executing additional vector wavefronts.

Figure 4:
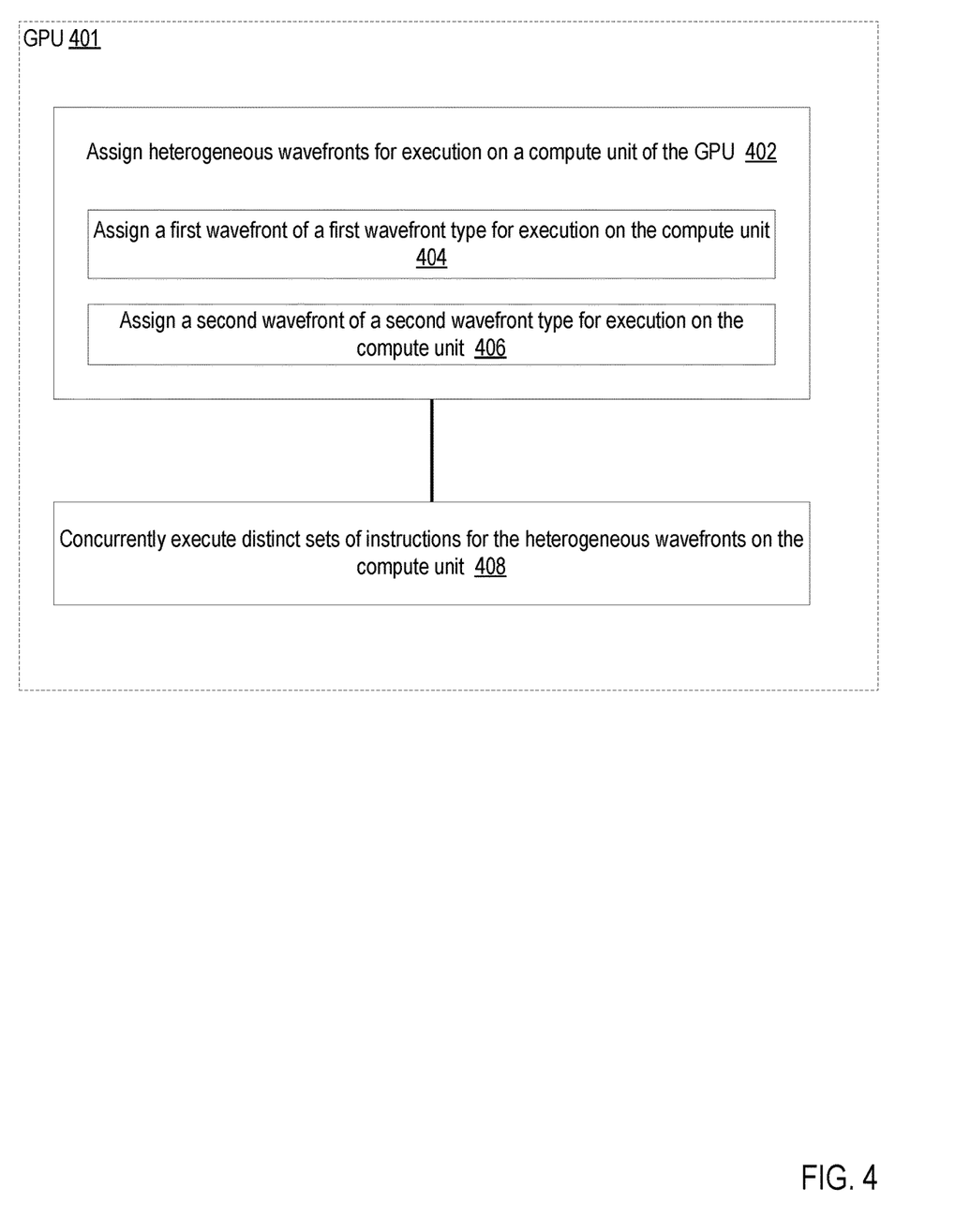
FIG. 4 sets forth a flow chart illustrating another example method of implementing heterogeneous wavefronts on a GPU in accordance with embodiments of the present disclosure.

For further explanation, FIG. 4 sets forth a flow chart illustrating an example method of implementing heterogeneous wavefronts on a GPU in accordance with the present disclosure. The example method of FIG. 4 may be implemented in a GPU 401. In some example, the GPU 401 includes the components of the GPU 102 in FIG. 1, although additional or fewer components of may be included in the GPU 401 without departing from embodiments of the present disclosure. The method of FIG. 1 includes assigning 402 heterogeneous wavefronts for execution on a compute unit of a processing device. In some examples, assigning 402 heterogeneous wavefronts for execution on a compute unit of a processing device is carried out by assigning multiple wavefronts to a compute unit where two or more of the multiple wavefronts are distinct in the size of the wavefront (e.g., in threads, work-items, or dimensions), the amount of resources allocated to the wavefront (e.g., VGPRs, SGPRs, context storage, etc.), the type of operation performed by the wavefront, the instructions executed in the wavefront, and/or the types of ALUs (e.g., scalar, vector, or scalar and vector) utilized to execute the instructions.

In some examples, the compute unit includes one or more single instruction multiple (SIMD) cores (or similar vector processing cores) and one or more scalar cores. For example, the compute unit may be implemented similarly to the compute unit 108 described above in view of FIG. 1 or the compute unit 300 described above in view of FIG. 3. In various examples, the processing device may be a graphics processing unit (GPU), a general purpose GPU, or an accelerated processing unit (APU) that combines a host processing unit (e.g., a CPU) and a GPU in the same semiconductor package (e.g., stacked dies or shared substrate).

In some examples, assigning 402 heterogeneous wavefronts for execution on a compute unit of a processing device includes assigning 404 a first wavefront of a first wavefront type for execution on the compute unit and assigning 406 a second wavefront of a second wavefront type for execution on the compute unit. In these examples, assigning 404 a first wavefront of a first wavefront type for execution on the compute unit may be carried out by assigning a vector compute wavefront that performs that outputs a vector computation, as discussed above. Assigning 406 a second wavefront of a second wavefront type for execution on the compute unit may be carried out by assigning a service-level wavefront that performs a device service operation such as host signaling or messaging, network messaging, PIM orchestration, and the like. For example, a service-level wavefront may be a scalar wavefront or system operation wavefront as discussed above.

The method of FIG. 4 also includes concurrently executing 408 distinct sets of instructions for the heterogeneous wavefronts on the compute unit. In some examples, concurrently executing 408 distinct sets of instructions for the heterogeneous wavefronts on the compute unit is carried out by executing one more instructions for one type of wavefront that is different from one or more instructions for another type of wavefront that is scheduled for execution on the compute unit. For example, different instructions may be issued for different types of wavefronts in the same cycle. In these examples, one type of wavefront may be a vector compute wavefront and another type of wavefront may be a service-level wavefront such as a scalar wavefront or a system operation wavefront. A first set of instructions is distinct from a second set of instructions in that the first set of instructions includes instructions for executing one set of operations and the second set of instructions includes different instructions for executing a different set of operations. For example, on the compute unit, two different instructions corresponding to two different wavefronts are executed concurrently as opposed to lockstep execution of the same instruction in a single wavefront. In some examples, the first set of instructions and the second set of instructions are distinct in that the first set of instructions includes only scalar compute instructions and the second set of instructions includes vector compute instructions. In these examples, a scalar core (e.g., scalar core 114 in FIG. 1) executes the scalar compute instructions while one or more SIMD cores (e.g., SIMD cores 130 in FIG. 1) concurrently execute the vector compute instructions. In other examples, the first set of instructions is distinct from a second set of instructions in that the first set of instructions includes code for performing a service-level operations (i.e., scalar or system operations) and the second set of instructions includes different code for performing vector compute operations.

Figure 5:
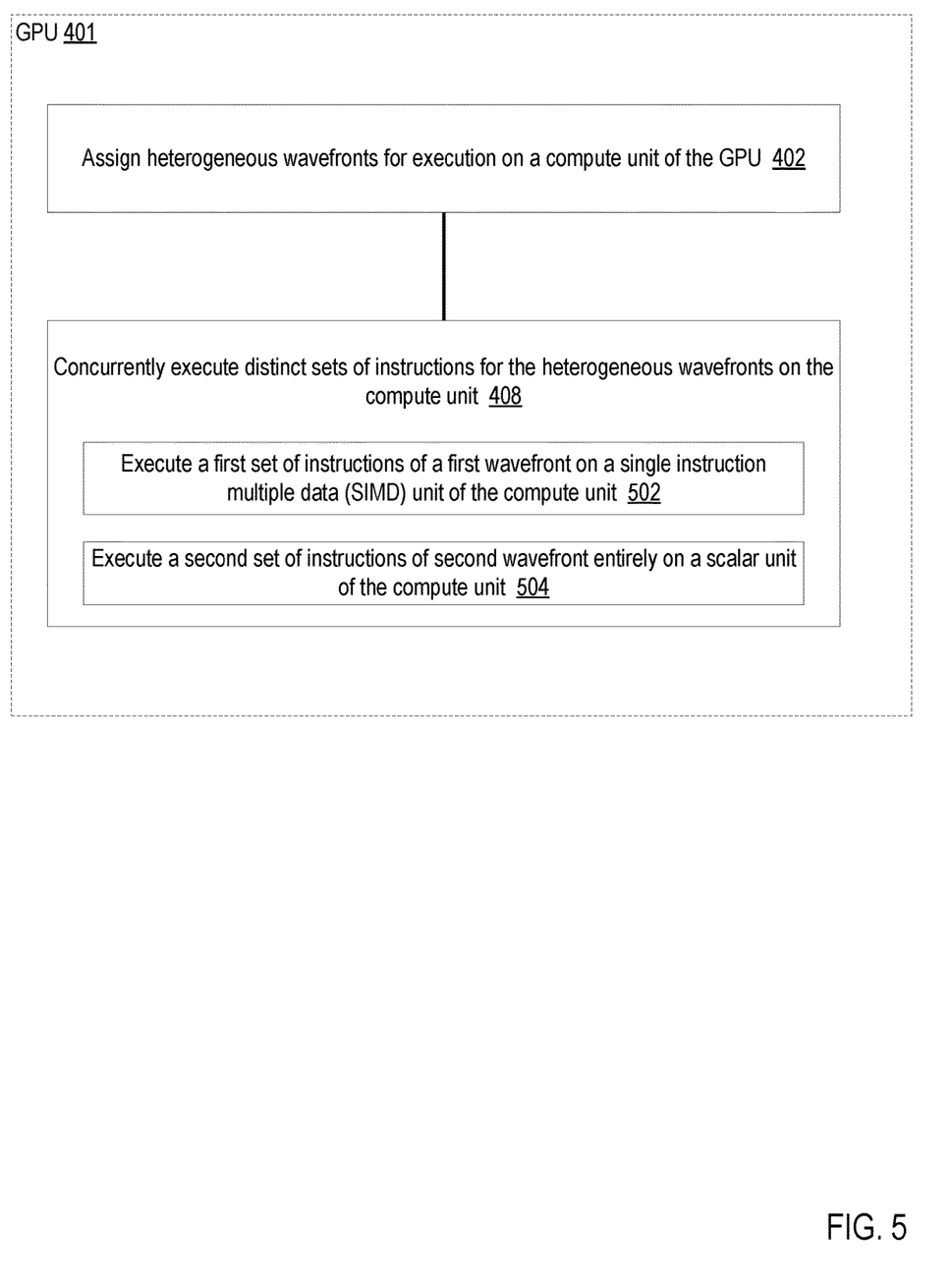
FIG. 5 sets forth a flow chart illustrating another example method of implementing heterogeneous wavefronts on a GPU in accordance with embodiments of the present disclosure.

For further explanation, FIG. 5 sets forth a flow chart illustrating an example method of implementing heterogeneous wavefronts on a GPU in accordance with the present disclosure. Like the example in FIG. 4, the example method in FIG. 5 also includes assigning 402 heterogeneous wavefronts for execution on a compute unit of a processing device and concurrently executing 408 distinct sets of instructions for the heterogeneous wavefronts on the compute unit. In the example method of FIG. 5, concurrently executing 408 distinct sets of instructions for the heterogeneous wavefronts on the compute unit incudes executing 502 a first set of instructions of a first wavefront on a SIMD unit of the compute unit. In some examples, executing 502 a first set of instructions of a first wavefront on a SIMD unit of the compute unit is carried out by executing a first set of instructions for a vector compute wavefront on a SIMD core such as the SIMD core 130 in FIG. 1 or the SIMD core 330 in FIG. 3.

In the method of FIG. 5, concurrently executing 408 distinct sets of instructions for the heterogeneous wavefronts on the compute unit also includes executing 504 a second set of instructions of second wavefront entirely on a scalar unit of the compute unit. In some examples, executing 504 a second set of instructions of second wavefront entirely on a scalar unit of the compute unit is carried out by executing a scalar wavefront on a scalar core such as the scalar core 114 of FIG. 1 or the scalar core 320 of FIG. 3. The scalar wavefront is a wavefront that includes only scalar instructions, as discussed above. A scalar instruction for a scalar wavefront, executed on the scalar core, may be executed in the same execution cycle as a vector instruction for a vector compute wavefront executed on the SIMD core. In one example, the scalar wavefront includes instruction for orchestrating PIM operations on a PIM-enabled memory device coupled to the processing device.

Figure 6:
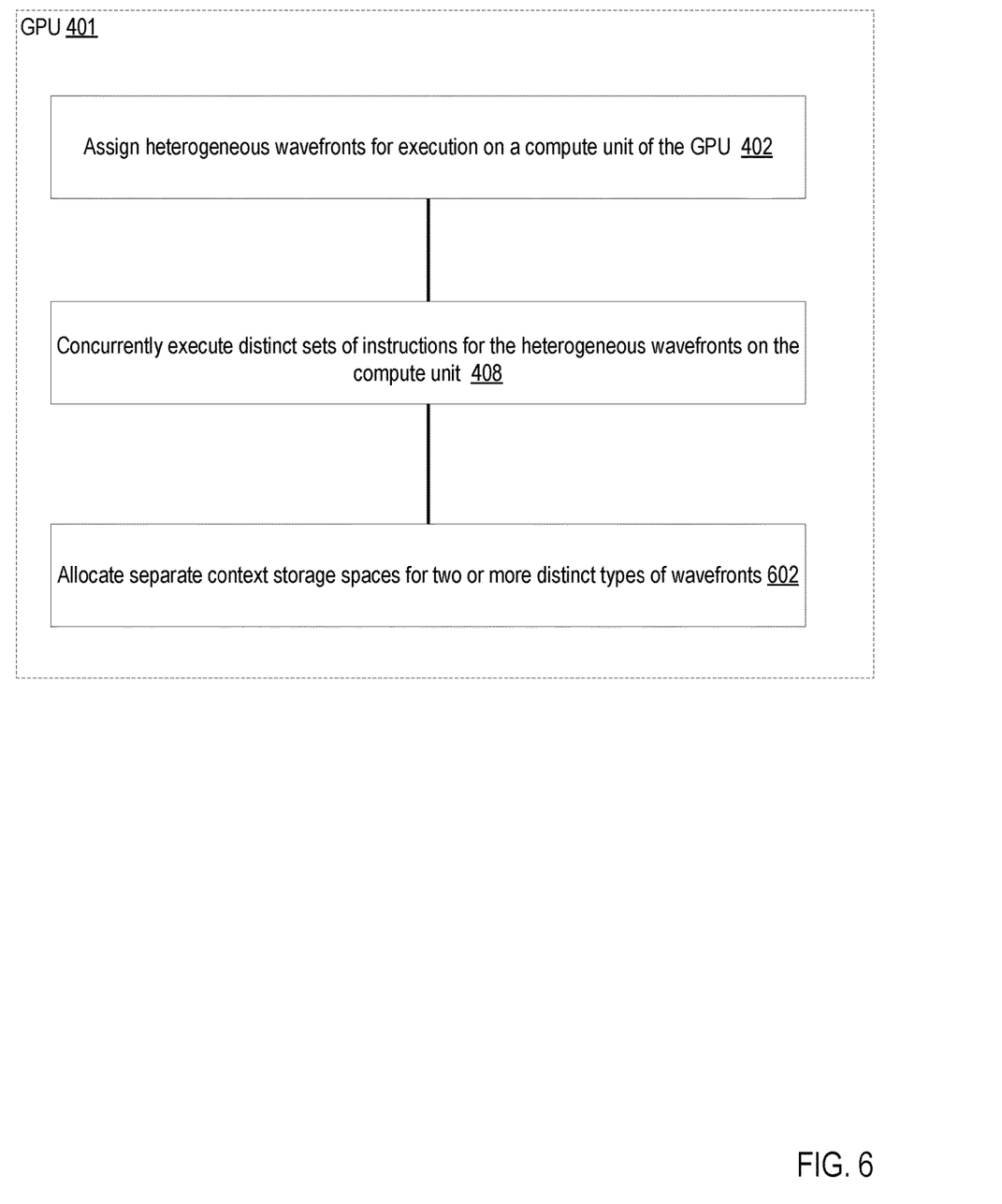
FIG. 6 sets forth a flow chart illustrating another example method of implementing heterogeneous wavefronts on a GPU in accordance with embodiments of the present disclosure.

For further explanation, FIG. 6 sets forth a flow chart illustrating an example method of implementing heterogeneous wavefronts on a GPU in accordance with the present disclosure. Like the example in FIG. 4, the example method in FIG. 6 also includes assigning 402 heterogeneous wavefronts for execution on a compute unit of a processing device and concurrently executing 408 distinct sets of instructions for the heterogeneous wavefronts on the compute unit. The method of FIG. 6 also includes allocating 602 separate context storage spaces for two or more distinct types of wavefronts. In some examples, allocating 602 separate context storage spaces for two or more distinct types of wavefronts is carried out by allocating a context storage space that stores contexts for one or more vector compute wavefront contexts (e.g., the compute wavefront context storage 120 of FIG. 1). In these examples, allocating 602 separate context storage spaces for two or more distinct types of wavefronts is also carried out by allocating a separate context storage space that stores contexts for one or more service-level wavefront contexts (e.g., the service-level wavefront context storage 122 of FIG. 1). For example, the service-level wavefront contexts may include contexts for scalar wavefronts or system operation wavefronts. Because vector compute wavefronts require more space to store wavefront contexts (i.e., register and state values) than service-level wavefront contexts, the service-level wavefront context storage space may be smaller than the vector compute wavefront context storage space.

Figure 7:
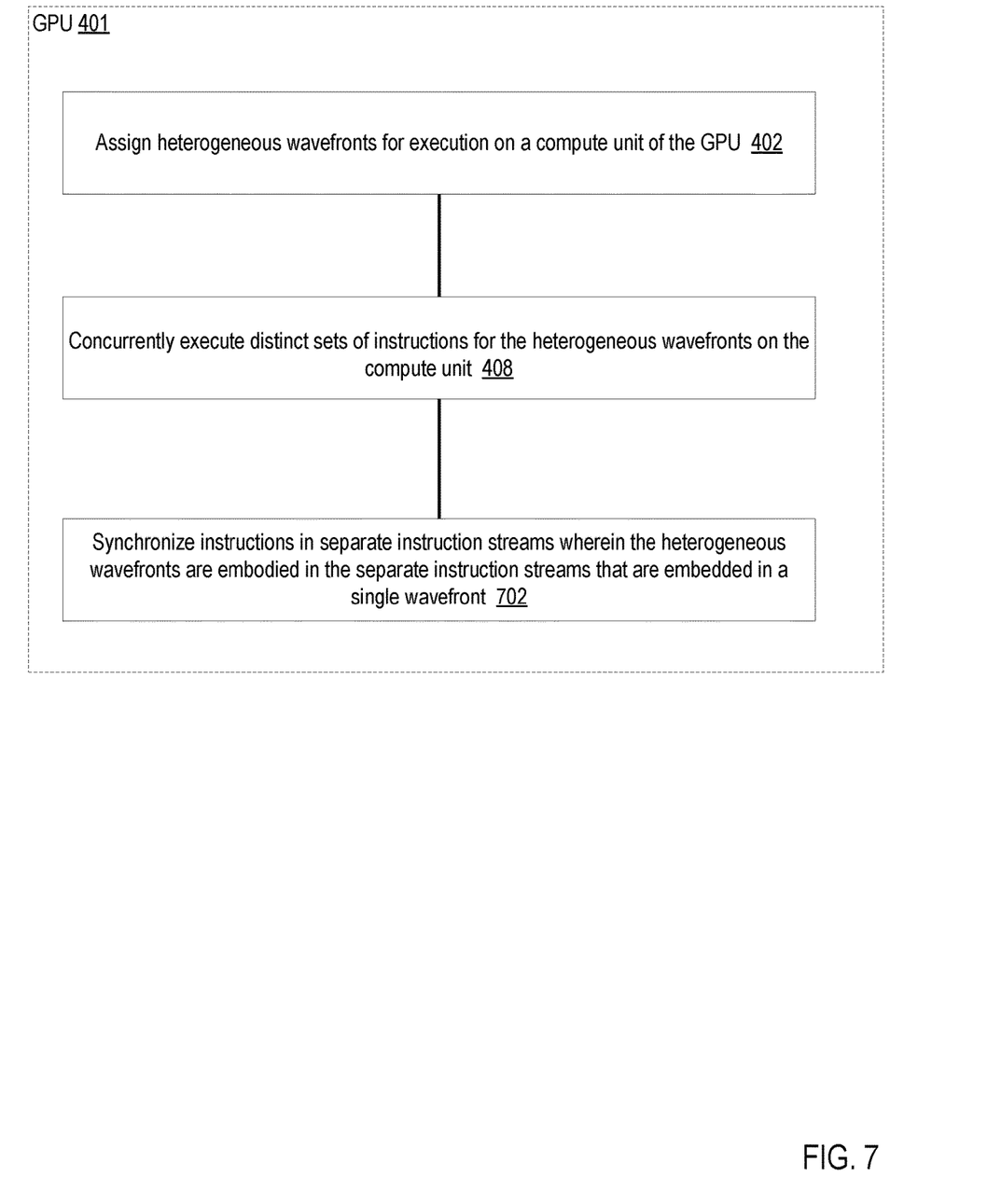
FIG. 7 sets forth a flow chart illustrating another example method of implementing heterogeneous wavefronts on a GPU in accordance with embodiments of the present disclosure.

For further explanation, FIG. 7 sets forth a flow chart illustrating an example method of implementing heterogeneous wavefronts on a GPU in accordance with the present disclosure. Like the example in FIG. 4, the example method in FIG. 7 also includes assigning 402 heterogeneous wavefronts for execution on a compute unit of a processing device and concurrently executing 408 distinct sets of instructions for the heterogeneous wavefronts on the compute unit. The method of FIG. 7 also includes synchronizing 702 instructions in the separate instruction streams where the heterogeneous wavefronts are embodied in separate instruction streams embedded in a single wavefront. Synchronizing 702 instructions in the separate instruction streams where the heterogeneous wavefronts are embodied in separate instruction streams embedded in a single wavefront may be carried out by enacting a barrier that blocks the dispatch of all younger instructions (not merely outstanding memory instructions) until all instructions in the separate instruction streams (e.g., vector and scalar instruction streams) of the wavefront have completed, as discussed above.

Figure 8:
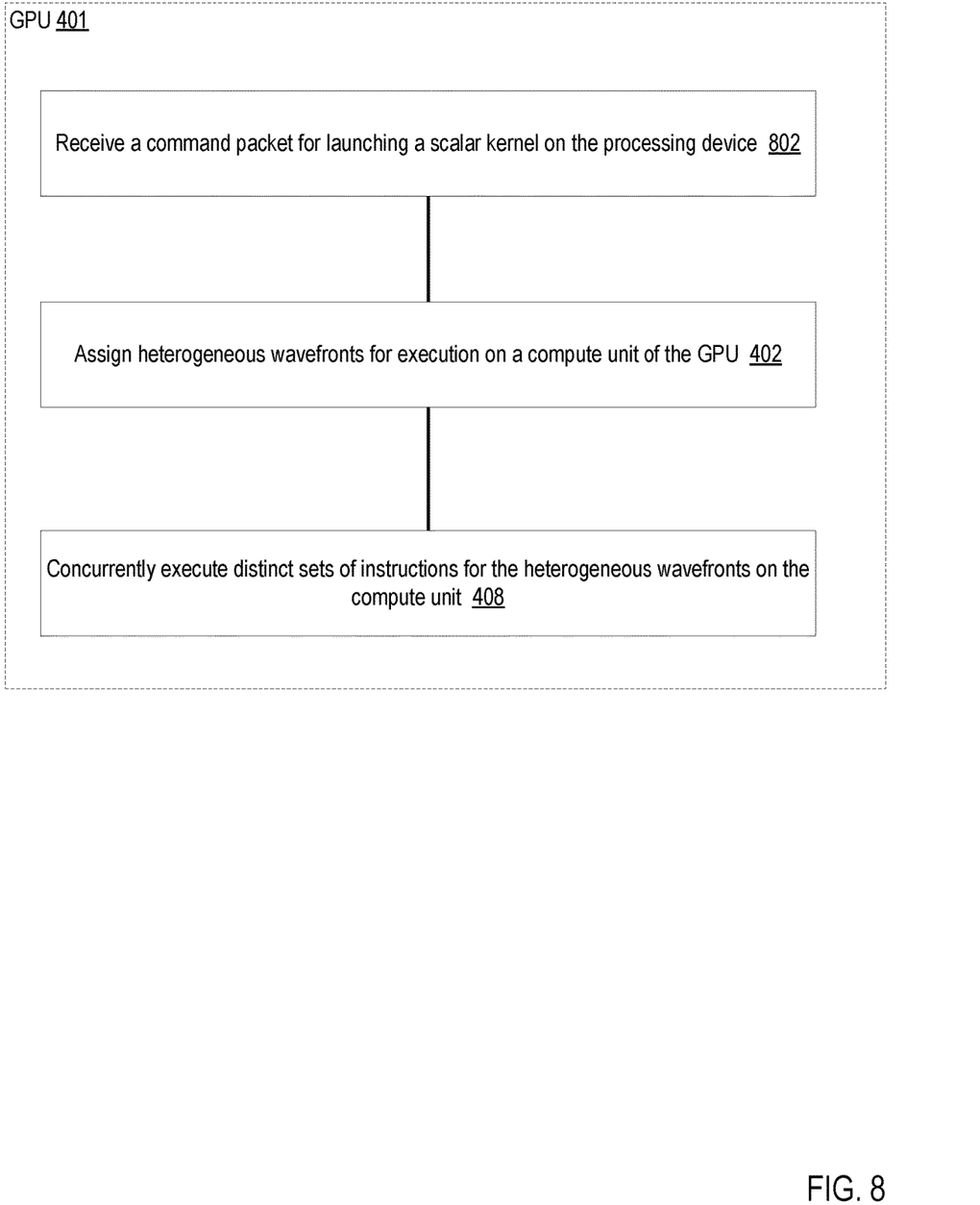
FIG. 8 sets forth a flow chart illustrating another example method of implementing heterogeneous wavefronts on a GPU in accordance with embodiments of the present disclosure.

For further explanation, FIG. 8 sets forth a flow chart illustrating an example method of implementing heterogeneous wavefronts on a GPU in accordance with the present disclosure. Like the example in FIG. 4, the example method in FIG. 8 also includes assigning 402 heterogeneous wavefronts for execution on a compute unit of a processing device and concurrently executing 408 distinct sets of instructions for the heterogeneous wavefronts on the compute unit. The method of FIG. 8 also includes receiving 802 a command packet for launching a scalar kernel on the processing device. In some examples, receiving 802 a command packet for launching a scalar kernel on the processing device is carried out by a command processor (e.g., the command processor 104 of FIG. 1) identifying a command packet that specifies a scalar kernel that should be launched on the processing device (e.g., the GPU 102 of FIG. 1), as discussed above. For example, the command packet may be an AQL packet that includes a header specifying that the command packet type is for launching a scalar kernel that is to be executed on a scalar core. In one example, an instruction set generated for the command packet includes scalar ISA instructions.

In view of the above description, readers will appreciate that implementing heterogeneous wavefront execution on a GPU presents several advantages. GPU resources can be preserved by recognizing that particular types of operations do not require all of the resources of a regular wavefront. For example, service-level operations such as signaling, messaging, and PIM orchestration may be carried out primarily on the scalar core. By implementing different types of wavefronts for such operations, these operations do not need to be scheduled in regular wavefronts that consume all of the resources associated with a wavefront. Furthermore, by implementing such non-vector operations in a wavefront, albeit a different type of wavefront, no substantial modification of the GPU pipeline is necessitated. Furthermore, because these alternative types of wavefronts consume fewer resources, context storage space for these wavefronts may also be minimized.

Embodiments can be a system, an apparatus, a method, and/or logic circuitry. Computer readable program instructions in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present disclosure are described herein with reference to flowchart illustrations and/or block diagrams of methods, apparatus (systems), and logic circuitry according to some embodiments of the disclosure. It will be understood that each block of the flowchart illustrations and/or block diagrams, and combinations of blocks in the flowchart illustrations and/or block diagrams, can be implemented by logic circuitry.

The logic circuitry may be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

What is claimed is:

1. A method of implementing heterogeneous wavefronts on a graphics processing unit (GPU), the method comprising:
assigning heterogeneous wavefronts for execution on a compute unit of a processing device, wherein each of the heterogeneous wavefronts includes a plurality of work items; and
concurrently executing distinct sets of instructions for two or more different heterogeneous wavefronts on the compute unit, wherein an execution slot in a scheduling queue of the compute unit occupied by a particular wavefront of the two or more different heterogeneous wavefronts includes an identification of a wavefront type of the particular wavefront.

2. The method of claim 1, wherein assigning heterogeneous wavefronts for execution on a compute unit of a processing device includes:
assigning a first wavefront of a first wavefront type for execution on the compute unit; and
assigning a second wavefront of a second wavefront type for execution on the compute unit.

3. The method of claim 2, wherein the first wavefront type is a vector compute wavefront type and wherein the second wavefront type is a service-level wavefront type.

4. The method of claim 3, wherein an execution slot occupied by a service-level wavefront is distinguished from an execution slot occupied by a vector compute wavefront in a scheduling queue of the compute unit.

5. The method of claim 1, wherein concurrently executing distinct sets of instructions for the heterogeneous wavefronts on the compute unit includes:
executing a first set of instructions of a first wavefront on a single instruction multiple data (SIMD) unit of the compute unit; and
executing a second set of instructions of second wavefront entirely on a scalar unit of the compute unit.

6. The method of claim 5, wherein the second wavefront includes processing-in-memory instructions.

7. The method of claim 1 further comprising allocating separate context storage spaces for two or more distinct types of wavefronts.

8. The method of claim 1, wherein the heterogeneous wavefronts are embodied in separate instruction streams embedded in a single wavefront; and wherein the method further comprises synchronizing instructions in the separate instruction streams.

9. The method of claim 1 further comprising receiving a command packet for launching a scalar kernel on the processing device.

10. A graphics processing unit (GPU) for implementing heterogeneous wavefronts, the GPU comprising:
- a workgroup manager; and
- a compute unit;
- the workgroup manager comprising logic configured to assign heterogeneous wavefronts for execution on the compute unit, wherein each of the heterogeneous wavefronts includes a plurality of work items; and
- the compute unit comprising logic configured to concurrently execute distinct sets of instructions for two or more different heterogeneous wavefronts on the compute unit, wherein an execution slot in a scheduling queue of the compute unit occupied by a particular wavefront of the two or more different heterogeneous wavefronts includes an identification of a wavefront type of the particular wavefront.

11. The GPU of claim 10, wherein assigning heterogeneous wavefronts for execution on a compute unit of a processing device includes:
- assigning a first wavefront of a first wavefront type for execution on the compute unit; and
- assigning a second wavefront of a second wavefront type for execution on the compute unit.

12. The GPU of claim 11, wherein the first wavefront type is a vector compute wavefront type and wherein the second wavefront type is a service-level wavefront type.

13. The GPU of claim 10, wherein concurrently executing distinct sets of instructions for the heterogeneous wavefronts on the compute unit includes:
- executing a first set of instructions of a first wavefront on a single instruction multiple data (SIMD) unit of the compute unit; and
- executing a second set of instructions of second wavefront entirely on a scalar unit of the compute unit.

14. The GPU of claim 10, wherein the GPU is further configured to allocate separate context storage spaces for two or more distinct types of wavefronts.

15. The GPU of claim 10, wherein the GPU is further configured to receive a command packet for launching a scalar kernel on the GPU.

16. A device for implementing heterogeneous wavefronts, the device comprising:
- a host central processing unit (CPU); and
- a graphics processing unit (GPU) coupled to the host CPU, wherein the GPU is configured to:
  - assign heterogeneous wavefronts for execution on a compute unit of a processing device, wherein each of the heterogeneous wavefronts includes a plurality of work items; and
  - concurrently execute distinct sets of instructions for two or more different heterogeneous wavefronts on the compute unit, wherein an execution slot in a scheduling queue of the compute unit occupied by a particular wavefront of the two or more different heterogeneous wavefronts includes an identification of a wavefront type of the particular wavefront.

17. The device of claim 16, wherein assigning heterogeneous wavefronts for execution on a compute unit of a processing device includes:
- assigning a first wavefront of a first wavefront type for execution on the compute unit; and
- assigning a second wavefront of a second wavefront type for execution on the compute unit.

18. The device of claim 17, wherein the first wavefront type is a vector compute wavefront type and wherein the second wavefront type is a service-level wavefront type.

19. The device of claim 16, wherein concurrently executing distinct sets of instructions for the heterogeneous wavefronts on the compute unit includes:
- executing a first set of instructions of a first wavefront on a single instruction multiple data (SIMD) unit of the compute unit; and
- executing a second set of instructions of second wavefront entirely on a scalar unit of the compute unit.

20. The device of claim 16, wherein the GPU is further configured to allocate separate context storage spaces for two or more distinct types of wavefronts.

* * * * *